Sheet 1, 2 Sheets.

E. Bourson.

Steam Brake.

No. 3,645. Reissued Sept. 21, 1869.

Witnesses,
Theo. Gusche
Wm. Freurn

Inventor.
E. Bourson
Per Munn & Co.
Attorneys.

Sheet 2. 2 Sheets.

E. Bourson.
Steam Brake.

No. 3,645. Reissued Sept. 21, 1869.

Witnesses.
Theo Inshe
Wm. Irwin

Inventor.
E. Bourson
Per Munn & Co
Attorneys

N. PETERS, PHOTO-LITHOGRAPHER, WASHINGTON, D. C.

United States Patent Office.

JULES STREHLER, OF NEW YORK, N. Y., ASSIGNEE OF EUGENE BOURSON.

*Letters Patent No.* 70,948, *dated November* 19, 1867; *reissue No.* 3,645, *dated September* 21, 1869.

IMPROVEMENT IN STEAM-ENGINES.

The Schedule referred to in these Letters Patent and making part of the same

*To all whom it may concern:*

Be it known that EUGENE BOURSON, of Brussels, in the Kingdom of Belgium, invented a new and useful Improvement in Steam-Engines, which he termed "a steam-brake," and that the following is a full, clear, and exact description thereof, reference being had to the accompanying drawings, which form part of this specification.

This invention relates to a new and improved method of retarding the motion of, and bringing to rest, a piston in a steam-cylinder, whereby the progress of railway-cars may be stopped without resorting to the hand-brakes or train-brakes ordinarily employed for such purpose.

The invention consists in conducting steam alone, or water alone, or steam and water combined, to either or both ends of either or both cylinders of a locomotive, so as to form a cushion on either or both sides of either or both pistons, whereby the motion of either or both of the pistons may be materially retarded, and thereby the revolution of the driving-wheels of a locomotive speedily stopped.

It also consists in the combination, with the ends of a steam-cylinder, of a pipe opening into such cylinder, and provided with a suitable cock or cocks, on opening which latter, steam or water, or steam and water combined, as the case may be, can be let into said cylinder on each side of the piston, and thereby form a cushion to retard the speed of said piston.

It also consists in the combination, with two steam-cylinders, of a suitable pipe for conducting steam or water, or steam and water combined, to both cylinders at the same time, for the purpose of providing an equal retarding effect on both pistons.

In the accompanying drawings—

Figure 5:
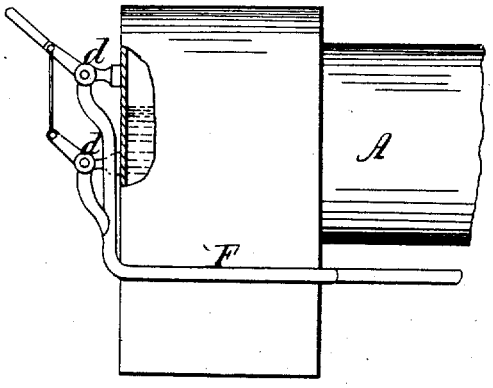
Figure 6:
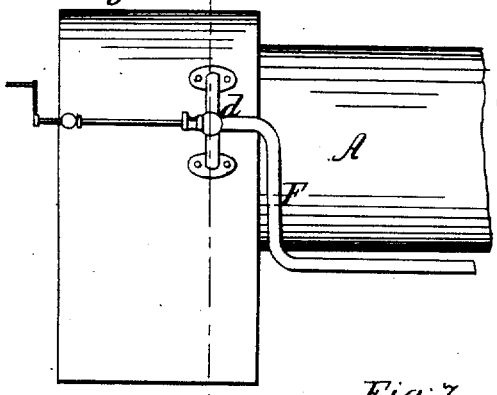
Figure 7:
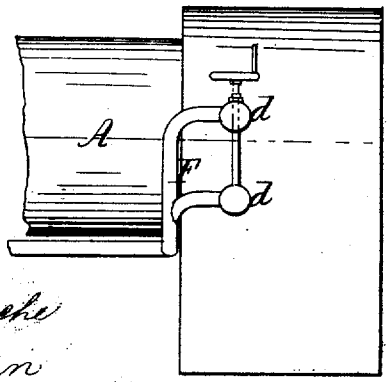

Figures 5, 6, and 7, are detail views of locomotive-boilers with my invention applied thereto.

Figure 8:
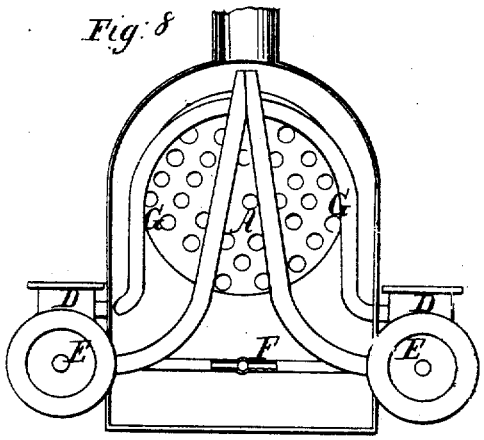

Figure 8 is an end view of a locomotive-boiler and cylinder provided with my invention.

Figure 9:
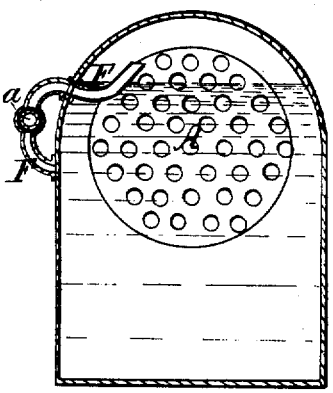

Figure 9 is a vertical cross-section of a boiler, the plane of section being indicated by the line *y y*, fig. 6.

Similar letters of reference indicate like parts in the several figures.

A designates the steam-boiler, and B the steam-cylinder of a locomotive.

C designates a branched pipe, opening into opposite ends of the cylinder B, (see figs. 1 and 2,) and into either the steam-chest D, (see fig 1,) or it directly into the boiler A, (as will be presently explained,) and said pipe C is provided with one or two taps, or two-way cocks. I have shown two in the drawings, in figs. 1 and 2, and it is desirable to connect said cocks, so that they can be simultaneously opened or closed for the admission of fluid to the cylinder. When only one is used, it can, if desired, be arranged so that on opening it, steam will be admitted to both ends of the cylinder. And when the apparatus is applied to a locomotive, the pipe C may be provided with blow-off pipes *e e*, as shown in fig. 2, for discharging the water from the cylinder, and it should also be provided with a rod, *b*, extending from said cocks *a a* to the cab of the locomotive, so that the engineer can operate the said cocks.

In fig. 8, a pipe F is shown, which pipe connects or opens into the cylinders on both sides of the boiler. It is not necessary that this pipe should be branched at its end, so as to open into both ends of a cylinder, as the result to be accomplished by it will be effected if said pipe opens into one end of the cylinder, say into either the forward or rear end of each cylinder. This pipe F is provided with a suitable stop-cock, and said pipe may be let directly into the steam-boiler or into the steam-chest, or it may take steam from the main steam-supply pipe.

In figs. 5, 6, and 9, a pipe, F, with a branched end is shown, one branch of which opens into the boiler below the water-line, and the other into the same above the water-line.

In fig. 5, two cocks, *d d*, serve to close the induction-ends of the pipe F, and a rod, *g*, is shown, which connects the two cocks, *d d*, and a hand-lever is so arranged, that by operating the same, both cocks can be opened simultaneously for allowing the steam and water to rush into the pipe F.

In figs. 6 and 9 the pipe F divides into two branches, one entering the boiler above and the other below the water-line, and a single stop or cock, *d*, serves to close the communication of the pipe F with its two branches.

It is obvious, that instead of the two tubes of pipe F, the pipe may enter the boiler below the water-line and extend above it, and have two orifices, one below and one above said water-line, in which latter case a single cock in the pipe F, outside the boiler, would answer.

When it is desired to use water alone, the connecting-rod *g* (refer more particularly to fig. 5) is dispensed with, and hence each cock, *d d*, works independently, and therefore water alone can be employed for a cushion in the cylinder, the pressure of the steam above it, in the boiler, forcing it through the pipe F into the cylinder.

Figure 1:
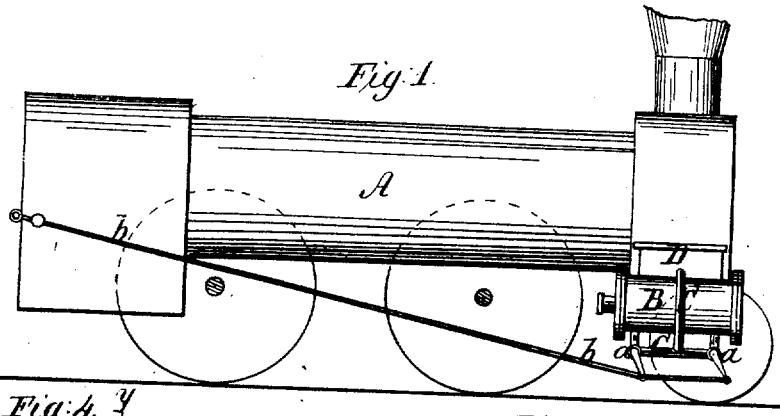
Figure 1 represents a side elevation of a locomotive, showing my invention applied thereto.
Figure 4:
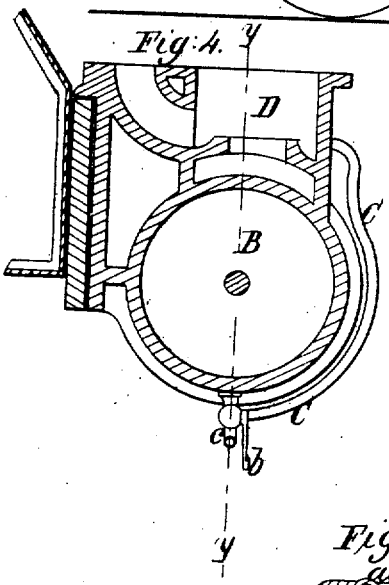
Figure 4 is a vertical cross-section of a cylinder with my invention applied to it, the plane of section being indicated by the line *x x*, fig. 2.
Figure 2:
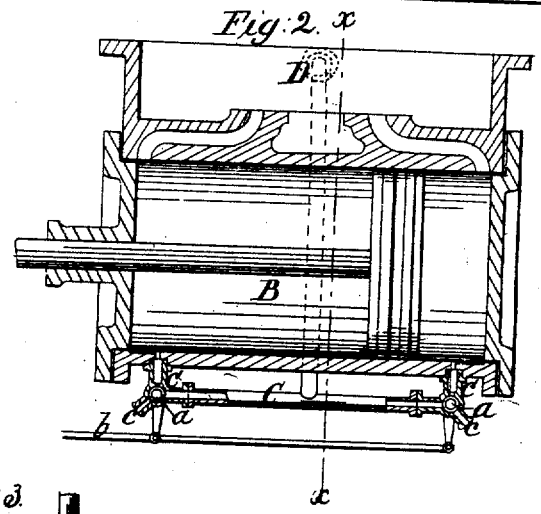
Figures 2 and 3 are longitudinal sectional views of cylinders, with my invention applied thereto.
Figure 3:
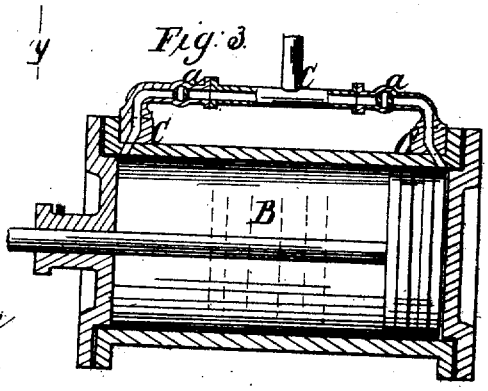

I prefer to make the area of the pipe C, fig. 1, or the cocks therein, very much less than the area of the cylinder-ports. I believe the proportion represented in the drawing to be a good one, but it may be varied, as desired, within reasonable limits.

The proper size of said pipe C, or of the smallest part thereof, I desire should be such, that enough steam alone, or water alone, or steam and water combined, cannot enter the cylinder to propel the piston; therefore, the fluid which does enter, cannot be discharged through the contracted orifice without creating a high back-pressure to produce the desired retardation of the piston.

It is, of course, to be understood, that when this invention is in operation, the main cylinder-ports are closed, as nearly as possible, by adjusting the starting-levers or links, so as to cause the valve or valves to lap the ports in a manner well understood by engineers. When the link-motion is used, I put the link in mid position, where the slight movement of the main valves does not materially affect the operation of my invention.

It is obvious, that modifications in the construction and arrangement of the pipes, &c., shown, may be adopted, but it is thought that sufficient description has been given to clearly show the manner in which this invention may be put into practice. Practical means have been illustrated and described, whereby steam alone, and water alone, and steam and water combined, may be caused to operate as a cushion or cushions at either or both ends of the steam-cylinder or cylinders, in such manner as to retard the motion of the piston, thereby constituting what has been termed "a steam-brake."

What is claimed as the invention of the said BOURSON, and desired to be secured by Letters Patent, is—

1. The method of retarding or stopping the motion of the piston in a steam-cylinder, substantially as herein specified.

2. The combination, with the two ends of a steam-cylinder, of a pipe C, provided with one or more stop-cocks, substantially as herein described.

3. The combination, with the pipe C, and its stop-cocks *a a*, of the blow-off pipes or orifices *c c*, substantially as herein specified.

4. The connection of the two cylinders of a locomotive-engine by means of a pipe, F, whereby steam or water, or both together, can be conducted into the ends of the cylinders, substantially as and for the purposes herein specified.

J. STREHLER.

Witnesses:
M. M. LIVINGSTON,
F. B. BEECHER.